United States Patent [19]

Robitaille et al.

[11] 3,969,127

[45] July 13, 1976

[54] MOLYBDATE CORROSION INHIBITING PIGMENT AND METHOD FOR PREPARING SAME

[75] Inventors: Dennis R. Robitaille, Detroit; Mark S. Vukasovich; Henry F. Barry, both of Ann Arbor, all of Mich.

[73] Assignee: The Sherwin-Williams Company, Cleveland, Ohio

[22] Filed: Mar. 10, 1975

[21] Appl. No.: 556,593

Related U.S. Application Data

[63] Continuation-in-part of Ser. No. 269,508, July 6, 1972, abandoned, which is a continuation of Ser. No. 365,697, May 31, 1973, abandoned.

[52] U.S. Cl. ............................... 106/292; 106/14; 106/306; 106/288 B; 106/309
[51] Int. Cl.$^2$ ........................ C09C 1/02; C09C 1/04
[58] Field of Search ................. 106/292, 308 B, 14, 106/306

[56] References Cited

UNITED STATES PATENTS

| | | | |
|---|---|---|---|
| 3,072,495 | 1/1963 | Pitrot | 106/308 B |
| 3,353,979 | 11/1967 | Hunn | 106/292 |
| 3,726,694 | 4/1973 | Moore et al. | 106/292 |

*Primary Examiner*—Winston A. Douglas
*Assistant Examiner*—J. V. Howard
*Attorney, Agent, or Firm*—Richard G. Smith

[57] ABSTRACT

A method for preparing an extended corrosion inhibiting pigment for use in formulating protective coatings for ferrous substrates in which a particulated inert carrier is slurried in an aqueous solution in the presence of molybdic oxide, to which a metal oxide of zinc, calcium, strontium and/or barium is added in a manner to effect a deposition of the corresponding metal molybdate on the carrier particles, whereafter the coated carrier is separated, dried and calcined at an elevated temperature.

12 Claims, No Drawings

3,969,127

MOLYBDATE CORROSION INHIBITING PIGMENT AND METHOD FOR PREPARING SAME

CROSS-REFERENCE TO RELATED APPLICATION

This application is a continuation-in-part of prior copending application Ser. No. 269,508, filed July 6, 1972, for "Molybdate Corrosion Inhibiting Pigment and Method for Preparing Same" and a continuation of U.S. Ser. No. 365,697, filed May 31, 1973 now abandoned.

BACKGROUND OF THE INVENTION

Certain metal molybdate salts have been recognized for their ability to inhibit corrosion of ferrous substrates when incorporated as pigments in conventional and special coating formulations. Such metal molybdate pigments in addition to their excellent capacity to inhibit corrosion, also provide advantages over other more conventional corrosion inhibiting pigments in view of their neutral or white color, providing for increased latitude in the formulation of coating systems which are of comparatively light color. Additionally, the non-toxicity of such metal molybdate pigments enables unrestricted use thereof, including areas and articles subject to human contact.

In spite of the foregoing advantages, the use of molybdate corrosion inhibiting pigments has been restricted due to their relatively high cost in comparison to other more common corrosion inhibiting pigments including, for example, zinc chromate, basic lead chromate, dibasic lead phosphite and the like. Attempts to effect a reduction in the cost of corrosion inhibiting molybdate pigments by forming physical mixtures of the metal molybdate compounds with inert extender materials has not been satisfactory in view of the necessity of incorporating upwards of 50% by weight of the active metal molybdate salt to achieve the required corrosion inhibiting properties. Such physical mixtures, in many instances, are still not competitively priced relative to the other more commonly used corrosion inhibiting pigments and, in some instances, such physically extended pigments have exhibited less than optimum corrosion inhibiting performance.

The present invention overcomes the cost and processing disadvantages heretofore associated with molybdate corrosion inhibiting pigments by providing a method in which a particulated substantially inert and compatible carrier material is provided with an adherent coating of a controlled amount of selected metal molybdate salts, producing a non-toxic, colorless extended pigment which is competitively priced with other known corrosion inhibiting pigments and also provides for good dispersibility of the active molybdate constituent throughout a coating formulation.

SUMMARY OF THE INVENTION

The benefits and advantages of the present invention are achieved by a method whereby an economical and effective extended corrosion inhibiting pigment is produced in which the pigment particles are characterized as comprising an inert and compatible core having an adherent coating of a precipitated metal molybdate salt or a molybdated metal oxide on the surfaces thereof. In accordance with the practice of the method comprising the present invention, a particulated carrier is dispersed in an aqueous solution in combination with a particulated molybdic oxide in a manner to effect a progressive dissolution of the molybdic oxide to supply soluble molybdate ions. A particulated metal oxide selected from the group consisting of zinc oxide, calcium oxide, strontium oxide, barium oxide, as well as mixtures thereof, is introduced into the aqueous solution, preferably in the form of a concentrated aqueous slurry thereof, in a manner whereby the metal oxide dissolves to supply metal ions for reaction with the molybdate ions forming the corresponding aqueous solution insoluble metal molybdate salt, which precipitates on the surfaces of the carrier particles. The aqueous solution is preferably heated to accelerate the dissolution and reaction and the proportion of metal oxide added is controlled between an amount required to stoichiometrically react with the molybdate ions present to a quantity up to about five times in excess thereof. The quantity of metal molybdate salt precipitated is usually controlled in an amount of from about 2 up to about 30% based on the total weight of the resultant corrosion inhibiting pigment.

At the conclusion of the reaction, the solid matter is separated from the residual aqueous solution and is preliminarily dried to remove the major portion of water therefrom, whereafter the dried and coated carrier is preferably subjected to a milling operation to break up any agglomerates formed during the coating operation. The drying and milling steps are followed by calcining at an elevated temperature, generally ranging between about 500°C to about 650°C, to remove any residual entrained water and to further complete the reaction between the active constituents on the carrier particles.

The process of the present invention, in addition to producing an effective and economical corrosion inhibiting pigment, provides the further advantage of not producing any polluting effluents which require special treatments prior to disposal. The filtrate or mother liquor containing residual unreacted molybdate ions is simply recovered and can be recycled for use in succeeding reactions.

Still further benefits and advantages of the present invention will become apparent upon a reading of the description of the preferred embodiments and the specific examples provided.

DESCRIPTION OF THE PREFERRED EMBODIMENTS

The quantity and concentration of the aqueous solutions, slurries and resultant corrosion inhibiting coating formulations are described in the specification and subjoined claims in terms of percentages by weight unless expressly indicated to the contrary.

The particulated extender or carrier material on which the metal molybdate salt or molybdated metal oxide is deposited in controlled amounts may comprise any one or mixtures of a variety of substances which are characterized as being compatible with the metal molybdate corrosion inhibiting salt and which are inert and substantially nonreactive with respect to the molybdate compound and metal oxide employed for forming the insoluble molybdate salt and which otherwise do not adversely affect the chemical and physical properties of the resultant corrosion inhibiting coating formulation, as well as the resultant coating produced therefrom. In consideration of the foregoing parameters, any one or combinations of the various known color and extending-type pigments normally used in compounding coating formulations can be satisfactorily employed which are of a size and configuration that is acceptable in accordance with conventional paint technology.

The average particle size of the particulated extender carrier may broadly range from as low as about 0.1 micron up to about 25 microns, and preferably from about 0.2 micron to about 10 microns. The configuration of the carrier particles is not critical, although particle shapes are preferred which maximize surface area for a given weight quantity of carrier. The particular size and configuration of the carrier material employed is controlled for any given situation in consideration of such factors as the quantity of metal molybdate inhibiting salt that is to be deposited on the carrier particles, the particular type and viscosity of the coating formulation in which the corrosion inhibiting pigment is to be dispersed, the concentration of the corrosion inhibiting pigment in the coating formulation, the type and amounts of other pigments present, the intended end use of the coating formulation, and the like.

While any of the known compatible pigment materials conventionally used in paint formulations can be satisfactorily employed, the so-called "extender-type pigments" are preferred, which are categorized as being insoluble, finely-divided solid particles that are wettable by the liquid vehicle of the paint formulation in which they are to be dispersed. Among such extender-type pigments are barium sulfates, calcium sulfates including gypsum; terra alba, plaster of Paris, silicas including quartz and diatomaceous earth, magnesium silicates and related minerals such as talc and soapstone, kaolin clay, mica, pumice and the like. Of the foregoing, talc and silica constitute particularly satisfactory carrier materials in view of their low cost and excellent compatibility with the metal molybdate salt and metal oxide to be deposited thereon.

While the aforementioned extender-type pigments are preferred, compatible color-type pigments of the types conventionally used in accordance with good paint technology can also be satisfactorily employed as carriers or extenders of the corrosion inhibiting molybdate salts. It will be appreciated, however, that the deposition of the adherent coating of metal molybdate salt on the pigment particles completely or at least partially obscures the underlying characteristic color of such colored pigment materials. In view of this, the use of colored pigment materials as the carrier material is usually restricted to coating formulations in which the resultant color is not critical or is of a secondary consideration. When employing color pigments, it is usually preferred to employ so-called "white pigments" as the compatible carrier, of which titanium dioxide constitutes a particularly satisfactory pigment. It will be apparent from the foregoing that optimum versatility is provided in accordance with the practice of the present invention when substantially non-toxic and colorless particulated carriers are employed on which the corrosion inhibiting molybdate salts are deposited, enabling unrestricted use of the corrosion inhibiting pigment in the formulation of white and other light-colored coating compositions, as well as dark-colored coating compositions, all of which are characterized as being substantially non-toxic.

The corrosion inhibiting molybdate salt or molybdated metal oxide which is deposited on the surfaces or at least a portion of the surfaces of the inert carrier particles, is comprised of a molybdate salt selected from the group consisting of zinc molybdate, calcium molybdate, strontium molybdate, barium molybdate and mixtures thereof, either alone or in further combination with an excess quantity of the corresponding metal oxides of zinc, calcium, strontium and barium and combinations thereof. The presence of the metal oxides in the corrosion inhibiting molybdate coating is accomplished by controlling the stoichiometry of the reaction medium during the deposition process as subsequently to be described. Conventionally, the stoichiometry of the reaction medium containing molybdate ions and metal ions, which upon reaction form an aqueous insoluble metal molybdate salt, is controlled so that the ratio of metal ions to molybdate ions ranges from about 1:1 up to as high as 5:1, and preferably from about 1:1 to about 2:1. Ratios in excess of about 5:1 cause an excessive dilution of the active metal molybdate salt with the metal oxide, as well as reducing the availability thereof, whereby such high ratios are generally less desirable than ratios between 1:1 up to 5:1. Typically, the reaction for molybdic oxide and zinc oxide in an aqueous medium to form the less soluble zinc molybdate salt is represented by the following equations:

$$MoO_3 + H_2O \rightarrow MoO_4^= + 2H^+$$
$$ZnO + 2H^+ \rightarrow Zn^{++} + H_2O$$
$$Zn^{++} + MoO_4^= \rightarrow ZnMoO_4$$

The reaction can be accelerated and driven toward completion by the application of heat and by agitating the aqueous reaction medium. The foregoing reaction equations represent a situation in which the metal ion and molybdate ions are present in stoichiometric proportions. The addition of excess zinc oxide in the reaction medium results in a coprecipitation and entrapment of the nonreacted excess zinc oxide in the resultant calcined metal molybdate salt corrosion inhibiting layer.

The reaction and deposition is carried out in a manner so as to deposit a quantity of the metal molybdate salt and/or molybdated metal oxide on the surfaces of the particulated carrier material from a minimum amount, which is established by that quantity at which a measurable increase is discernible in the corrosion inhibiting properties of a paint formulation incorporating significant portions of the pigment, to quantities of up to about 30% and even higher. Corrosion inhibiting molybdate pigments which incorporate quantities of the active molybdate salts greater than about 30%, based on the total weight of the pigment, have been found not to provide any appreciable advantages in comparison to similar pigments incorporating less than about 30% of the same active constituents and, accordingly, are less desirable in view of economic considerations. On the other hand, quantities of the corrosion inhibiting active constituents in amounts usually of at least about 2% have been found necessary to impart good corrosion inhibiting properties to a resultant paint formulation by providing an adequate supply of the molybdate constituents to combat corrosion of ferrous substrates over extended time periods. In accordance with the preferred practice, the metal molybdate salt and/or molybdated metal oxide coating is deposited on the carrier in an amount ranging from about 10 up to about 25% based on the total weight of the corrosion inhibiting pigment, whereby use of moderate quantities of such extended pigments in paint formulations, either alone or in combination with other pigment materials, has been found to provide satisfactory corrosion inhibiting performance in the vast majority of conditions.

In accordance with the process aspects of the present invention, an aqueous slurry is formed containing the particulated carrier and a finely-particulated molybdic oxide ($MoO_3$) which is subject to a high shear agitation to maintain a substantially uniform suspension of the solid particulate matter therein. The molybdic oxide, while sparingly soluble in water, does progressively dissolve in accordance with the reaction equation previously set forth to produce the aqueous soluble molybdate ions ($MoO_4^=$). The solution of the molybdic oxide causes the aqueous solution to become acidic and in accordance with the preferred practice of the present invention, the pH of the solution is maintained within a range of about 3 to about 6. As previously mentioned, heating the solution facilitates a solution of the reactive constituents and drives the reaction to completion so that temperatures ranging from about room temperature (20°C) up to the boiling point of the solution, and preferably from about 60°C to about 90°C are employed.

The quantity of carrier particles in the aqueous solution will usually range from as low as about 30 up to about 60%. Typically, the concentration of the inert extender particles is controlled from about 40 up to about 50%, whereby a substantially uniform suspension is obtained employing moderate agitation and wherein the viscosity of the reaction medium is such that the desired quantities of molybdic oxide particles can concurrently be maintained in suspension for progressive dissolution and reaction. Conventionally, all of the molybdic oxide is added to the slurry initially, although it is also contemplated that the molybdic oxide can be progressively added to replenish the molybdic oxide as it becomes consumed during the reaction. In this connection, the concentration of the molybdic oxide in the initial slurry may range from as low as about 2 to as high as about 25%, depending on the quantity of carrier particles present and the desired coating weight to be deposited on the carrier particles. The molybdic oxide may comprise a substantially pure grade containing only minimal quantities of impurities, although technical grades containing as high as about 5% conventional impurities can also be satisfactorily employed in forming the reaction medium. In order to facilitate suspension and dissolution of the molybdic oxide, the particles should be of average size less than about 25 microns and, preferably of an average size ranging from about 0.1 micron to about 10 microns. In the case of pure molybdic oxides produced by sublimation, the acicular crystalline structure maximizes surface area and the major dimension may, in some cases, exceed about 25 microns.

The metal oxide or mixture of metal oxides is directly added to the aqueous slurry containing the suspended carrier and molybdic oxide particles which, in accordance with the preferred practice of the present invention, is accomplished by first forming a preliminary aqueous slurry of the metal oxide and which slurry in turn is added to the aqueous reaction solution. The addition of the metal oxide or aqueous slurry containing the metal oxide is performed on a progressive basis to effect a replenishment of the metal ions as they are consumed by reaction with the molybdate ions and precipitation of the metal molybdate coating on the carrier particles. As previously indicated, the quantity of metal oxide may range from about stoichiometric proportions relative to the molybdate ions present to excess amounts ranging up to about 5:1 stoichiometric ratio of metal oxide to molybdic oxide, and preferably from a stoichiometric ratio of about 1:1 up to about 2:1. In those instances in which appreciable quantities of excess metal oxide is to be employed, the progressive addition of the metal oxide or aqueous slurry containing the metal oxide is accelerated, whereby some entrainment or entrapment of the particulated metal oxide in the precipitated molybdate salt coating is effected.

The metal oxide powder is of a particle size similar to that of the molybdic oxide and is controlled so that the average particle size is less than about 25 microns, and preferably less than about 10 microns. The concentration of the metal oxide in the aqueous slurry, if employed, may range from as low as about 10 to as high as about 50%. At concentrations above about 50%, the viscosity of the slurry becomes excessive, detracting from the uniform distribution thereof upon addition to the reaction medium. While concentrations of less than 10% of the metal oxide containing slurry can be employed, such lower concentrations usually cause an excessive dilution of the aqueous reaction medium.

The reaction is carried out until substantially all of the molybdic oxide has been consumed and converted to the corresponding metal salt deposit. During the course of the reaction, the aqueous slurry becomes more viscous and vigorous agitation is usually required, depending on the concentration of the several constituents, to assure uniformity of the reaction medium and a continuance of the reaction to completion. At the completion or substantial completion of the reaction, which is evidenced by the absence of any molybdate ions in the aqueous reaction solution, the solid matter is removed, such as by filtration, and the resultant filtrate or mother liquor is recycled for preparing a new aqueous reaction solution. The solid matter recovered comprising the coated carrier, together with any unreacted metal oxide and molybdic oxide particles, is preferably first subjected to a drying step, such as by heating to a temperature usually of from about 100°C to about 150°C, while in contact with circulating air to effect a removal of the major portion of residual water therefrom. Thereafter, the substantially dry particulated mass is subjected to a milling or pulverizing operation to effect a break up of any agglomerates that may have formed during the coating phase of the process and wherein substantially all of the resultant pigment is reduced in size to pigment grade.

The dried and milled corrosion inhibiting pigment is subjected to a calcining step at an elevated temperature, which will range from a minimum, corresponding to that at which the water of hydration is removed, up to a maximum temperature below that at which a caking or fusion of the pigment particles occurs. Conventionally, calcining temperatures ranging from about 500°C to about 650°C have been found satisfactory for most coating compositions and carrier materials. The calcining operation is carried out for a period of time sufficient to effect a substantially complete removal of any entrapped water and water of hydration, and to further cause a completion of the reaction between the metal oxide and molybdic oxide constituents. Generally, calcining time periods of around eight hours at a temperature of about 550°C have been found satisfactory for this purpose. The resultant calcined corrosion inhibiting pigment can thereafter be directly used in the compounding of coating formulations which have been found to exhibit excellent corrosion inhibiting properties.

The calcined extended corrosion inhibiting pigment prepared in accordance with the process of the present invention can be employed for compounding a variety of conventional as well as specialty type protective coating compositions or paints. The term "paint" as employed in the specification and subjoined claims is used in its broad sense to include any one of a variety of solid and liquid mixtures consisting essentially of a binder having the solid extended corrosion inhibiting pigment dispersed therethrough, which, upon application to a substrate, is effective to form a thin protective film. In liquid paint systems, the vehicle comprises the liquid portion of the paint composition and may be composed of any one of the well known film-forming constituents or binders in combination with a volatile solvent or thinner, which is adapted to evaporate during the drying or curing of the paint film or, alternatively, in some instances, may itself react with the binder constituent and become an integral portion thereof. In accordance with known paint technology, the solvent or thinner may be omitted in those situations in which the paints or coating composition are of the hot-melt type, or wherein they are adapted to be applied to a substrate utilizing an electrostatic spray or powder spray technique in which the thinning effect of such solvent is usually unnecessary.

The specific type of binder material employed is not critical, provided that it is compatible with the corrosion inhibiting extended pigments, and may include any of those known in the coating art as being suitable for formulating protective coatings of the types heretofore known. Accordingly, the binder may be one which forms a resultant protective film by either oxidation or polymerization of the constituents. Typical of such binders are drying oils, including modified drying oils; formaldehyde condensation resins including phenolic, urea and triazine resins; allyl resins and polyurethane resins. The binder constituents may also comprise those which form a protective film as a result of the evaporation of the volatile solvent constituent of the liquid vehicle or by a congealing thereof from a hot-melt upon cooling. Typical examples of the foregoing binders are nitrocellulose and other cellulose esters and ethers of the types employed in lacquer formulations; vinyl resins, styrene resins, any one of a variety of the polyacrylates and polymethacrylates, rubber derivatives, polyamide resins and polyolefins, of which polyethylene is exemplary. Less common but also applicable for use in accordance with the practice of the present invention are binders which form a film in response to a coagulation of the binder particles from a latex or dispersion of natural or synthetic binding agents in addition to resins, such as polytetrafluoroethylene and high molecular weight vinyl resins, including plastisols, which frequently require a subsequent heat treatment to effect a thermal fusion of the particles into a substantially continuous film.

It will be apparent from the foregoing that any one of a variety of binder constituents of the types well known in the art can be satisfactorily employed in combination with the extended corrosion inhibiting pigments of the present invention to provide for improved corrosion protection of ferrous substrates consistent with the particular article and corrosive environment to which it is to be subjected in order to provide for optimum protection. Of the large variety of suitable paint systems, organic coating systems, including an alkyd resin binding agent dispersed in a solvent in combination with the corrosion inhibiting pigment of the present invention, as well as other coloring and extender-type pigments, is perhaps the most common for use as protective coatings in industrial applications. Alkyd-type coating compositions of the aforementioned type include amine-modified alkyds including amine resins, such as urea and melamine resins. Epoxy and modified epoxy resins also provide excellent binder systems in which the extended corrosion inhibiting pigment of the present invention can be employed to advantage.

In order to still further illustrate the present invention and the excellent corrosion inhibiting properties achieved by the extended molybdate pigments, a series of typical paint formulations were prepared which were applied to test panels and evaluated under accelerated corrosion test conditions. It will be understood that the specific formulations prepared are merely illustrative and are not intended as being restrictive of the present invention as herein described and as set forth in the subjoined claims.

EXAMPLE

A series of nine extended corrosion inhibiting molybdate pigments were prepared having a composition as set forth in Table 1.

TABLE 1

| | | Corrosion Inhibiting Extended Pigments Parts by Weight | | | | |
|---|---|---|---|---|---|---|
| Pigment Sample | Stoichiometric Ratio | Metal Oxide | | | Molybdate $MoO_3$ | Carrier Talc |
| | | ZnO | CaO | SrO | | |
| P1 | 1:1 | 36.1 | | | 63.9 | 400 |
| P2 | 2:1 | 53.1 | | | 46.9 | 400 |
| P3 | 4:1 | 69.3 | | | 30.7 | 400 |
| P4 | 1:1 | | 28.0 | | 72.0 | 400 |
| P5 | 2:1 | | 43.8 | | 56.2 | 400 |
| P6 | 4:1 | | 60.9 | | 39.1 | 400 |
| P7 | 1:1 | | | 41.9 | 58.1 | 400 |
| P8 | 2:1 | | | 59.0 | 41.0 | 400 |
| P9 | 4:1 | | | 74.2 | 25.8 | 400 |

Each pigment sample contained 20% by weight of the metal molybdate or molybdated metal oxide deposit based on the total weight of the final calcined pigment. As shown in Table 1, the oxides employed included zinc, calcium and strontium, which were varied to provide different stoichiometric ratios and talc was employed as being representative of the various usable types of inert carriers that can be satisfactorily employed.

The pigment samples of Table 1 were prepared by forming aqueous slurries of the molybdic oxide and carrier material on one part and a metal oxide on the other part. The slurries are heated to a temperature of about 70°C. In the preparation of each pigment sample, the quantity of water required is approximately 1.5 liters per pound of final product produced. Upon attaining the reaction temperature of 70°C, the slurry containing the metal oxide is slowly added to the slurry containing the molybdic oxide and carrier particles. The liquid reaction medium is subjected to continued agitation and the temperature is maintained at about 70°C for a period of about one hour at which the reaction is substantially complete. The solids are then separated from the slurry by filtration. During the reaction, vigorous agitation is required to maintain a uniform suspension due to a considerable thickening effect occasioned by the dissolution and reaction of the materials. The separated solids are subjected to a preliminary drying at 110°C to remove the major portion of residual water entrapped therein, whereafter the dried material is subjected to a milling to reduce the particle size to pigment grade, whereafter the resultant milled pigment is subjected to a calcination step at about 550°C for a period of eight hours.

The test pigments thus prepared are incorporated in a basic linseed base alkyd paint formulation comprising a roller paste component and a let-down component of compositions as set forth in Table 2.

TABLE 2

| Roller Paste | Parts by Weight | | | |
|---|---|---|---|---|
| | RP1 | RP2 | RP3 | RP4 |
| Linseed Alkyd Solution | 480.0 | 480.0 | 480.0 | 480.0 |
| Raw Linseed Oil | 46.0 | 46.0 | 46.0 | 46.0 |
| Soya Lecithin | 8.0 | 8.0 | 8.0 | 8.0 |
| Aluminum Distearate | 6.0 | 6.0 | 6.0 | 6.0 |

TABLE 2-continued

BASIC PAINT FORMULATIONS

| | | | | |
|---|---|---|---|---|
| Montmorillonite Clay | 4.0 | 4.0 | 4.0 | 4.0 |
| Non-Chalk Rutile TiO$_2$ | 253.4 | 253.4 | 686.6 | 654.2 |
| Talc - Low Oil Absorptive | 253.2 | 164.6 | 287.0 | 287.0 |
| Talc - High Oil Absorptive | 34.6 | 119.0 | 138.0 | 138.0 |
| Subtotal | 1085.2 | 1081.0 | 1655.6 | 1623.2 |

| Let-Down | Parts by Weight |
|---|---|
| Linseed Alkyd Solution | 224.4 |
| Lead Drier, 24% | 18.0 |
| Manganese Drier, 6% | 6.0 |
| Cobalt Drier, 6% | 4.0 |
| Guaiacol (Technical Grade) | 4.0 |
| Mineral Spirits | 246.0 |
| | 502.4 |

As noted, four separate roller paste constituents, designated as RP1 through RP4, were prepared which deviate principally in the quantity of solid pigment contained therein. Test paint formulations were prepared having compositions as set forth in Table 3.

TABLE 3

TEST PAINT FORMULATIONS

| Component | A | B | C | D | E | F | G | H | I |
|---|---|---|---|---|---|---|---|---|---|
| Roller Paste | | | | | | | | | |
| Type | RP1 | RP1 | RP1 | RP1 | RP1 | RP1 | RP1 | RP1 | RP1 |
| Quantity | 1085.2 | 1085.2 | 1085.2 | 1085.2 | 1085.2 | 1085.2 | 1085.2 | 1085.2 | 1085.2 |
| Extended Pigment | | | | | | | | | |
| Type | P1 | P1 | P2 | P2 | P3 | P3 | P4 | P4 | P5 |
| Quantity | 460.6 | 414.6 | 484.0 | 435.6 | 500.0 | 450.0 | 459.8 | 413.8 | 463.8 |
| Miscellaneous Pigments | | | | | | | | | |
| Zinc Oxide | | 88.8 | | 88.8 | | 88.8 | | 88.8 | |
| Oncor M50 | | | | | | | | | |
| Zinc Yellow | | | | | | | | | |
| Zinc Molybdate | | | | | | | | | |
| Calcium Molybdate | | | | | | | | | |
| Strontium Molybdate | | | | | | | | | |
| Zinc Phosphate | | | | | | | | | |
| Talc (Asbestine 325) | | | | | | | | | |
| Let Down | 502.4 | 502.4 | 502.4 | 502.4 | 502.4 | 502.4 | 502.4 | 502.4 | 502.4 |

| Component | J | K | L | M | N | V | W | X | Z |
|---|---|---|---|---|---|---|---|---|---|
| Roller Paste | | | | | | | | | |
| Type | RP1 | RP1 | RP1 | RP1 | RP1 | RP2 | RP2 | RP3 | RP4 |
| Quantity | 1085.2 | 1085.2 | 1085.2 | 1085.2 | 1085.2 | 1081.0 | 1081.0 | 1655.6 | 1623.2 |
| Extended Pigment | | | | | | | | | |
| Type | P6 | P7 | P7 | P8 | P9 | | | | |
| Quantity | 462.2 | 470.4 | 423.4 | 479.4 | 487.4 | | | | |
| Miscellaneous Pigments | | | | | | | | | |
| Zinc Oxide | | | | 88.8 | | | | | 60.8 |
| Oncor M50 | | | | | | 648.4 | | | |
| Zinc Yellow | | | | | | | 547.2 | | |
| Zinc Molybdate | | | | | | | | | |
| Calcium Molybdate | | | | | | | | | |
| Strontium Molybdate | | | | | | | | | |
| Zinc Phosphate | | | | | | | | | |
| Talc (Asbestine 325) | | | | | | | | | |
| Let Down | 502.4 | 502.4 | 502.4 | 502.4 | 502.4 | 502.4 | 502.4 | 502.4 | 502.4 |

| Components | AA | BB | CC | DD |
|---|---|---|---|---|
| Roller Paste | | | | |
| Type | RP1 | RP1 | RP1 | RP1 |
| Quantity | 1085.2 | 1085.2 | 1085.2 | 1085.2 |
| Extended Pigment | | | | |
| Type | | | | |
| Quantity | | | | |
| Miscellaneous Pigments | | | | |
| Zinc Oxide | | | | |
| Oncor M50 | | | | |
| Zinc Yellow | | | | |
| Zinc Molybdate | 92.2 | | | |
| Calcium Molybdate | | 92.0 | | |
| Strontium Molybdate | | | 94.0 | |
| Zinc Phosphate | | | | 516.8 |
| Talc (Asbestine 325) | 368.4 | 367.8 | 376.4 | |
| Let Down | 502.4 | 502.4 | 502.4 | 502.4 |

In each instance, the extended corrosion inhibiting pigment and/or miscellaneous pigment was incorporated in the roller paste component. The individual test paints were prepared on a three-roll mill to attain a Hegman grind of 5. As will be noted in Table 3, in addition to test paint formulations incorporating the various sample pigments prepared in accordance with the present invention, paint formulations incorporating several commercially available corrosion inhibiting pigments were also included for comparative purposes in addition to corrosion inhibiting pigments comprising physical mixtures of zinc, calcium and strontium molybdate with talc.

The various constituents as listed in Tables 2 and 3, with the exception of the extended corrosion inhibiting pigment of the present invention, comprise conventional ingredients employed in formulating coating compositions.

Among the miscellaneous pigments, Oncor M50 comprises a basic lead silico-chromate pigment. The Asbestine 325 pigment comprises talc available from International Talc Company having a degree of fineness wherein 99.95% passes through a 325-mesh screen and wherein the average particle size is about 4.6 microns.

The resultant paints were spray-coated on a minimum of six Type S (surface ground) 3-inch by 9-inch steel test panels to deposit a resultant film, after drying, of a thickness of 1.5 mils. At the completion of a seven day drying cycle, the painted test panels were scored with a large X and subjected to a standard 5% salt-fog environment for periods of 160, 320 and 480 hours. At the completion of each test period, one panel, representative of each test paint formulation, was removed from the salt-fog chamber and the coating was stripped to enable an evaluation of the substrate for corrosion development. The results of these evaluations are tabulated in Table 4.

TABLE 4

TEST PAINT PIGMENTATION PERFORMANCE DATA

| Test Paint Code | Pigment Moles of $MoO_3$ | Excess ZnO | Core | Salt-Fog Rating 160 Hours | 320 Hours | 480 Hours |
|---|---|---|---|---|---|---|
| ZnO | | | | | | |
| A | 1 | 1 | — | Talc | 6 | 6 | 5 |
| B | 1 | 1 | 10% | Talc | 8+ | 6 | 6 |
| C | 2 | 1 | — | Talc | 8 | 5 | 5 |
| D | 2 | 1 | 10% | Talc | 8 | 5 | 5 |
| E | 4 | 1 | — | Talc | 7 | 5 | 5 |
| F | 4 | 1 | 10% | Talc | 8 | 7 | 7 |
| CaO | | | | | | |
| G | 1 | 1 | — | Talc | 6 | 5 | 3 |
| H | 1 | 1 | 10% | Talc | 7 | 6 | 6 |
| I | 2 | 1 | — | Talc | 7 | 4 | 3 |
| J | 4 | 1 | — | Talc | 9 | 6 | 5 |
| SrO | | | | | | |
| K | 1 | 1 | — | Talc | 6 | 4 | 3 |
| L | 1 | 1 | 10% | Talc | 8 | 8 | 6 |
| M | 2 | 1 | — | Talc | 7 | 7 | 4 |
| N | 4 | 1 | — | Talc | 7 | 3 | 3 |
| V | Basic lead silicochromate | | | 5 | 5 | 3 |
| W | Zinc yellow | | | 5 | 6 | 4+ |
| X | Titanium dioxide | | | 4 | 2 | 1 |
| Z | $TiO_2$ + 10% ZnO | | | 8 | 5 | 3+ |
| AA | $ZnMoO_4$/talc physical mixture | | | 5 | 4 | 3 |
| BB | $CaMoO_4$/talc physical mixture | | | 7 | 4 | 3+ |
| CC | $SrMoO_4$/talc physical mixture | | | 6 | 4 | 3+ |
| DD | Zinc phosphate | | | 7 | 4 | 3 |

The numerical rating employed is based on a scale where zero is a total failure of the protective coating, while 10 constitutes a perfect score. It will be apparent from the data accumulated on test paint samples A through N that the corrosion inhibiting pigment extended in accordance with the process of the present invention provided very favorable performance data. The physical addition of zinc oxide in combination with some of the extended molybdate pigments, as represented by test paint samples B, D, F, H and L, evidence a slight improvement in some instances in the corrosion protection afforded in comparison to similar test paints devoid of any supplemental zinc oxide. The corrosion inhibiting performance of test paint samples A through N, in most instances, exhibit a substantial improvement over the performance obtainable by using conventional commercially available corrosion inhibiting pigments, such as samples V, W and DD. In addition, the corrosion inhibiting performance of the test paints incorporating the molybdate pigment prepared in accordance with the present invention were substantially superior than that obtained by physical mixtures of the corresponding metal molybdate salts with talc, as evidenced by samples AA, BB and CC.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A method for the manufacture of a substantially non-toxic complex corrosion inhibiting pigment which comprises the steps of (1) dispersing a water-insoluble inert inorganic pigmentary sized solid particulate carrier in an aqueous carrier, (2) further dispersing a quantity of pigmentary sized molybdenum trioxide in said aqueous carrier to effect sufficient dissolution thereof to produce reactively available molybdate ions, (3) adding to said slurry and slurrying therein a metal oxide also in a pigmentary size range selected from the group consisting of zinc oxide, calcium oxide, strontium oxide, barium oxide and mixtures thereof thereby producing corresponding reactive, available metal ions in said aqueous carrier slurry, (4) reacting said metal ions with said molybdate ions to precipitate substantially insoluble metal molybdate compounds as an adherent deposit on said particulated inert carrier, continuing said acid-base type reaction and precipitation of the corresponding metal molybdate reaction products on said inert carrier particles until the reaction is substantially completed, separating the thus formed salt-free complex molybdated pigment product from the gross aqueous salt-free reaction medium, drying and removing substantially all the remaining moisture including water of hydration therefrom.

2. The method of claim 1, including the further step of heating, but not above the boiling point the said aqueous slurry reaction mixture of step 4.

3. The method of claim 1, including the further steps of heating and vigorously agitating said aqueous slurry during said reaction of step 4 to maintain a substantially uniform suspension of said particulated inert carrier and said molybdenum oxide in said slurry.

4. The method of claim 1, wherein the metal oxide is dispersed in water to form a slurry before adding the metal oxide to the first prepared aqueous suspension of molybdenum trioxide of steps (1) and (2) in step (3).

5. The method as defined in claim 1, wherein the complex molybdated pigment product is further dried after separation from the aqueous medium to remove the predominant quantity of water therefrom and thereafter milled to eliminate any agglomerates present therein and calcining the milled product to remove any water of hydration present.

6. The method of claim 1, wherein in the reaction and precipitation steps from about 2 up to about 30% of the selected metal molybdate is deposited on said particulated inert carrier, by weight of the total complex pigment product.

7. The method of claim 1 where the selected metal molybdate is from about 10 to about 25% by weight of the total complex pigment product.

8. The method as defined in claim 1, wherein the molar quantity of metal ions to the molybdate ions is within the range of from 1:1 to not more than 5:1.

9. The method as defined in claim 1, wherein the molar concentration of metal oxide is in excess of that required stoichiometrically to form the corresponding metal molybdate.

10. The method of claim 9, wherein the molar ratio of metal to molybdate is 2:1.

11. The process of claim 1, wherein the metal oxide is zinc oxide.

12. A non-toxic corrosion inhibiting complex inorganic pigment, the major portion of the volume of which is an inert carrier nucleus consisting of a chemically inert, pigmentary size inorganic particle, the surface of which have precipitated and bound thereon a substantially water-insoluble metal molybdate reaction product the metal selected from the group consisting of zinc, calcium, strontium, barium and mixtures thereof; the acidic group consisting of the molybdate ion, the molar ratio of metal ion to molybdate ion from 1:1 to not more than 5:1 and the weight percent of active metal molybdate salt to said inert carrier particle not less than about 2 nor more than about 30% of the complex pigment, said complex pigment characterized by freedom ab initio of occluded corrosion inducing salts.

* * * * *